United States Patent
Samaniego

(10) Patent No.: US 7,764,220 B1
(45) Date of Patent: Jul. 27, 2010

(54) SYNTHETIC APERTURE RADAR INCORPORATING HEIGHT FILTERING FOR USE WITH LAND-BASED VEHICLES

(75) Inventor: Raymond Samaniego, Prosper, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/428,280

(22) Filed: Apr. 22, 2009

(51) Int. Cl.
*G01S 13/90* (2006.01)

(52) U.S. Cl. .................. 342/25 A; 342/25 C; 342/22; 342/179

(58) Field of Classification Search .............. 342/22, 342/27, 25 R, 25 A–25 F, 179
See application file for complete search history.

(56) References Cited

U.S. PATENT DOCUMENTS

| | | | |
|---|---|---|---|
| 4,866,446 A | | 9/1989 | Hellsten |
| 5,680,138 A | * | 10/1997 | Pritt .......................... 342/169 |
| 6,216,540 B1 | | 4/2001 | Nelson et al. |
| 6,255,981 B1 | * | 7/2001 | Samaniego .............. 342/25 R |
| 6,441,772 B1 | | 8/2002 | Hellsten et al. |
| 6,650,274 B1 | | 11/2003 | Krikorian et al. |
| 6,741,201 B1 | | 5/2004 | De Jongth et al. |
| 6,747,593 B1 | | 6/2004 | Jaffer |
| 6,750,805 B1 | | 6/2004 | Cameron |
| 6,756,935 B1 | | 6/2004 | Cameron et al. |
| 6,911,933 B1 | | 6/2005 | Mutz et al. |
| 7,009,550 B2 | * | 3/2006 | Moeller-Jensen ............ 342/52 |
| 7,015,855 B1 | * | 3/2006 | Medl et al. ................. 342/25 A |
| 7,136,010 B2 | * | 11/2006 | Cirillo et al. .............. 342/25 R |
| 7,154,434 B1 | | 12/2006 | Sego |
| 7,456,780 B1 | * | 11/2008 | Garren ...................... 342/25 A |
| 7,498,968 B1 | | 3/2009 | Bielek |
| 2002/0175849 A1 | | 11/2002 | Arndt et al. |
| 2006/0214835 A1 | * | 9/2006 | Lee et al. ....................... 342/22 |
| 2007/0024489 A1 | | 2/2007 | Cerwin |
| 2008/0246647 A1 | * | 10/2008 | Hellsten ....................... 342/22 |
| 2009/0207067 A1 | * | 8/2009 | Samaniego et al. ........... 342/22 |

FOREIGN PATENT DOCUMENTS

| | | | | |
|---|---|---|---|---|
| GB | 2168870 | A | * | 6/1986 |
| JP | 61167888 | A | * | 7/1986 |
| JP | 61194379 | A | * | 8/1986 |

OTHER PUBLICATIONS

"An application of the monopulse principle to determining elevation angles in SAR images", Freeman, A.; Zink, M.; Geoscience and Remote Sensing, IEEE Transactions on, vol. 32, Issue 3, May 1994 pp. 616-625.*

* cited by examiner

*Primary Examiner*—John B Sotomayor
(74) *Attorney, Agent, or Firm*—Baker Botts L.L.P.

(57) ABSTRACT

According to one embodiment, a synthetic aperture radar includes an image former coupled to a pair of antennas that are oriented at differing elevational angles relative to one another. The antennas are configured in a land-based vehicle that moves horizontally relative to a target having one or more internal features. The image former receives signals from the antennas that are indicative of electro-magnetic radiation reflected from a target and generates images according to the signals. The image former then generates a final image by filtering the amplitude component of the imagery from a first antenna against the amplitude component of the imagery from a second antenna.

20 Claims, 4 Drawing Sheets

US 7,764,220 B1

SYNTHETIC APERTURE RADAR INCORPORATING HEIGHT FILTERING FOR USE WITH LAND-BASED VEHICLES

GOVERNMENT RIGHTS

This invention was made with Government support under Contract Number HR0011-06-C-0111 DARPA VisiBuilding Phase 1. The Government has certain rights in this invention

TECHNICAL FIELD OF THE DISCLOSURE

This disclosure generally relates to synthetic aperture radars, and more particularly, to a synthetic aperture radar performs height filtering of internal features of targets and a method of operating the same.

BACKGROUND OF THE DISCLOSURE

Synthetic aperture radars (SARs) use multiple radar return signals to generate two-dimensional images of targets. To acquire images having useful information, the antenna of the synthetic aperture radar is moved in relation to the target. Imagery generated by synthetic aperture radars are often used for detection of objects that may be otherwise difficult to obtain using known photographic devices that generate imagery using visible light.

SUMMARY OF THE DISCLOSURE

According to one embodiment, a synthetic aperture radar includes an image former coupled to a pair of antennas that are oriented at differing elevational angles relative to one another. The antennas are configured in a land-based vehicle that moves horizontally relative to a target having one or more internal features. The image former receives signals from the antennas that are indicative of electro-magnetic radiation reflected from a target and generates images according to the signals. The image former then generates a final image by filtering the amplitude component of the imagery from a first antenna against the amplitude component of the imagery from a second antenna.

Some embodiments of the disclosure may provide numerous technical advantages. For example, one embodiment of the synthetic aperture radar may provide enhanced height filtering for various internal features of targets such as multi-story buildings. The synthetic aperture radar has at least two co-located antennas oriented at differing elevational angles relative to one another. With this relative orientation, each antenna may receive reflected electro-magnetic radiation with an amplitude component proportional to an elevation of a particular internal feature that caused this reflection. The image former compares this relative amplitude to determine the internal feature's height. For targets such as multi-story buildings therefore, the synthetic aperture radar may provide enhanced imaging of walls, doorways, personnel, boxes, or other internal features that may be unique to each floor.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Synthetic aperture radars (SAR) are radars that use signal processing techniques to form images of moving targets. A two-dimensional image can be formed by separating radar returns from an object in range and in Doppler frequency. In some intelligence, surveillance, and reconnaissance (ISR) activities, it would be useful to generate imagery of buildings or other structures that may be situated in metropolitan or other civilian regions. Although synthetic aperture radars may provide useful imagery, access to buildings may be relatively limited in some cases. For example, synthetic aperture radars have been relegated to use on relatively large mobile platforms such as aircraft due to the synthetic apertures relatively large size. Aircraft on which these synthetic aperture radars are configured may be limited in how close they may approach certain types of buildings. Moreover, synthetic aperture radars configured on aircraft often do not generate imagery depicting useful information about various internal features of buildings or other structures that would otherwise be useful for intelligence, surveillance, and reconnaissance activities.

Figure 1:
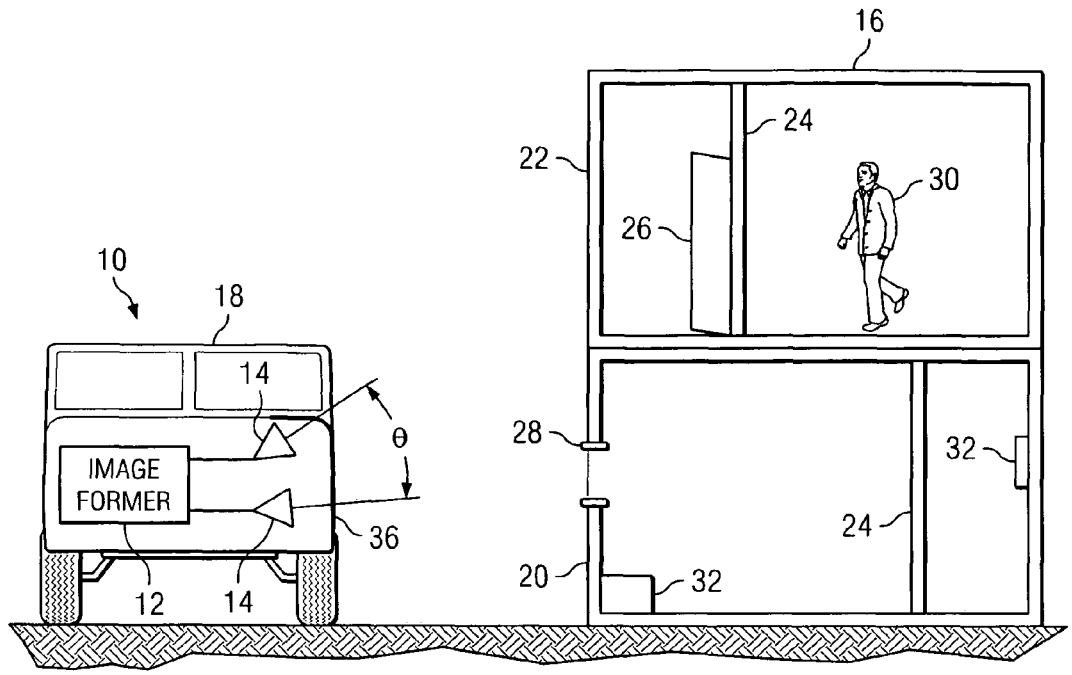
FIG. 1 shows one embodiment of a synthetic aperture radar according to the teachings of the present disclosure.

FIG. 1 shows one embodiment of a synthetic aperture radar 10 according to the teachings of the present disclosure. Synthetic aperture radar 10 includes an image former 12 coupled to at least two antennas 14 that are configured to transmit electro-magnetic radiation toward a building 16 and receive the electro-magnetic radiation reflected from the building 16. Antennas 14 are configured at differing elevational orientations Θ relative to one another. Synthetic aperture radar 10 is sufficiently small to be configured in a vehicle 18 that may travel in relatively close proximity to building 16. As will be described in detail below, the orientation Θ of antennas 14 relative to one another provide detection of one or more internal features of building 16 according to their height.

Detection of the height of the building's various internal features may provide numerous benefits. For example, building 16 may have a first floor 20 and a second floor 22 that are at a differing height relative to one another. Each of these floors 20 and 22, in turn, may each have various unique internal features such as walls 24, a door 26, a window 28, and a person 30. In some cases, it would be useful to know the location of other internal features within building 16 such as boxes that may include safes, strongboxes that store personal belongings, and/or electrical switchboxes that provides electrical power for the building 16. Knowledge of the location of these internal features may be useful for intelligence, surveillance, and reconnaissance activities, particularly in a military context in which enemy combatants may be operating in the building 16.

Antennas 14 may include any type of structure that may be configured in a land-based vehicle 18 and transmits and/or receives electro-magnetic radiation suitable for detecting the various internal features of building 16. In one embodiment, land-based vehicle 18 may include a radome 36 that conceals antennas 14 while allowing electro-magnetic radiation generated and received by antennas 14 to freely pass through. In this manner, synthetic aperture radar 10 may obtain useful information about internal features of building 16 with reduced possibility of detection by enemy combatants operating in building 16.

In one embodiment, antennas 14 are horn antennas that transmit and/or receive electro-magnetic radiation at frequencies ranging from 0.5 to 3.0 Giga-Hertz (GHz). Electro-magnetic radiation in this frequency range may provide sufficient penetration depth of the electro-magnetic radiation to detect the various internal features of building 16. In another embodiment, synthetic aperture radar 10 may use only two antennas 14 for detecting internal features of building 16. One antenna 14 transmits the electro-magnetic radiation while both receive reflected electro-magnetic radiation reflected from building 16. In certain embodiments, use of only two antennas 14 may provide an advantage in that horn antennas that are well suited for transmission and receipt of electro-magnetic radiation at the previously cited frequency range, may be configured in a relatively small land-based vehicle such as a sedan while being relatively easily concealed.

Figure 2:
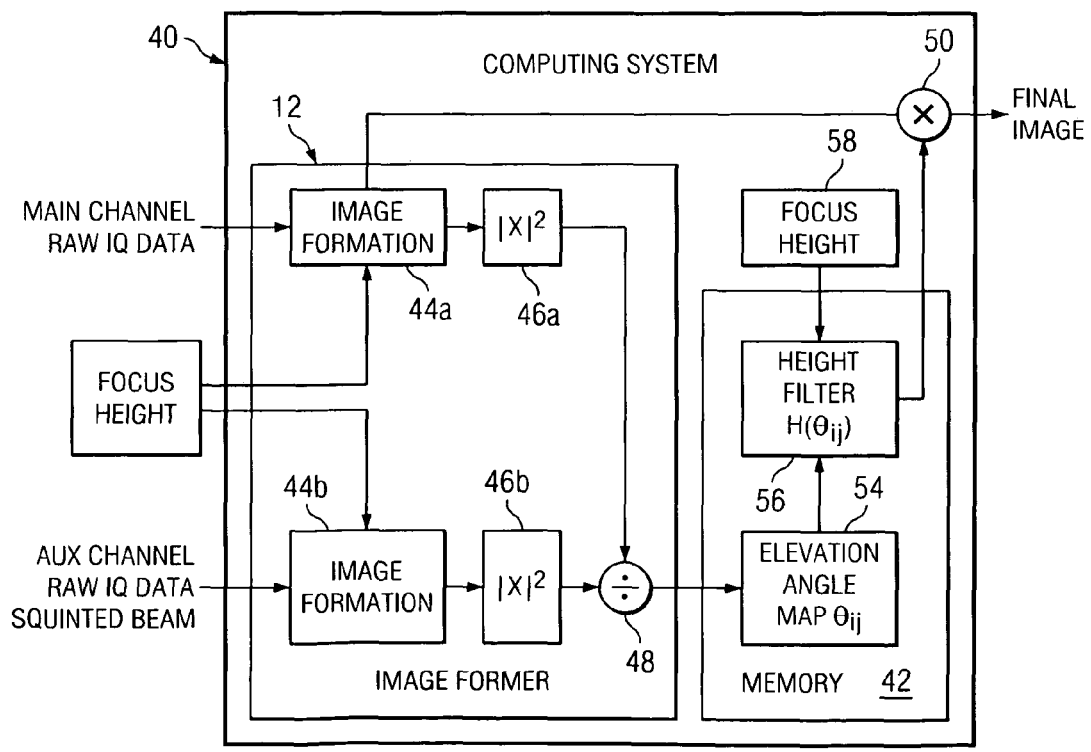
FIG. 2 is a diagram showing one embodiment of the image former of FIG. 1 configured on a computing system.

FIG. 2 is a diagram showing one embodiment of the image former 12 of FIG. 1 configured on a computing system 40. Image former 12 includes instructions stored in a memory 42 and executed by a processor of a computing system. Computing system 40 may be any suitable computing system, such as a network coupled computing system or a stand-alone computing system. Examples of stand-alone computing systems may include a personal computer, a personal digital assistant (PDA), a laptop computer, or a mainframe computer. A network computing system may be a number of computers coupled together via a network, such as a local area network (LAN), a metropolitan area network (MAN), or a wide area network (WAN) that collectively execute the instructions of image former 12. Computing system 40 that executes image former 12 may be configured on land-based vehicle 18 or may be configured external to land-based vehicle 18. In a particular embodiment in which image former 12 is configured external to land-based vehicle 18, synthetic aperture radar 10 may include a transmission system for conveying telemetry information from antennas 14 to the remotely configured computing system 40 executing the image former 12.

Image former 12 includes image formation blocks 44a and 44b and an amplitude adjustment block 46a and 46b for each antenna 14. Image former 12 also includes a combining block 48 that combines the output from each amplitude adjustment block 46a and 46b and a summing block 50. Image formation blocks 44a and 44b are each coupled to an antenna 14 of synthetic aperture radar 10. Each image formation block 44a or 44b receives a signal indicative of electro-magnetic radiation received by its respective antenna 14 and generates an image corresponding to the received signal. The generated image includes multiple portions that may be referred to as pixels that are arranged in a two-dimensional configuration. Amplitude adjustment blocks 46a and 46b receive information associated with the generated image and applies an amplitude adjustment factor to the received image.

Image former 12 generates an elevation angle map 54 and a height filter 56 that may be stored in memory 42. Following amplitude adjustment, combining block 48 combines corresponding pixels from each generated image to form a elevation angle map 54. From the elevation angle map 54 image former 12 generates a height filter 56 that may be summed, using summing block 50, with imagery generated by an image formation block 44a to form a final image. To focus the final image according to a desired height, a height focus adjustment input 58 may be applied to height filter 56.

Figure 3:
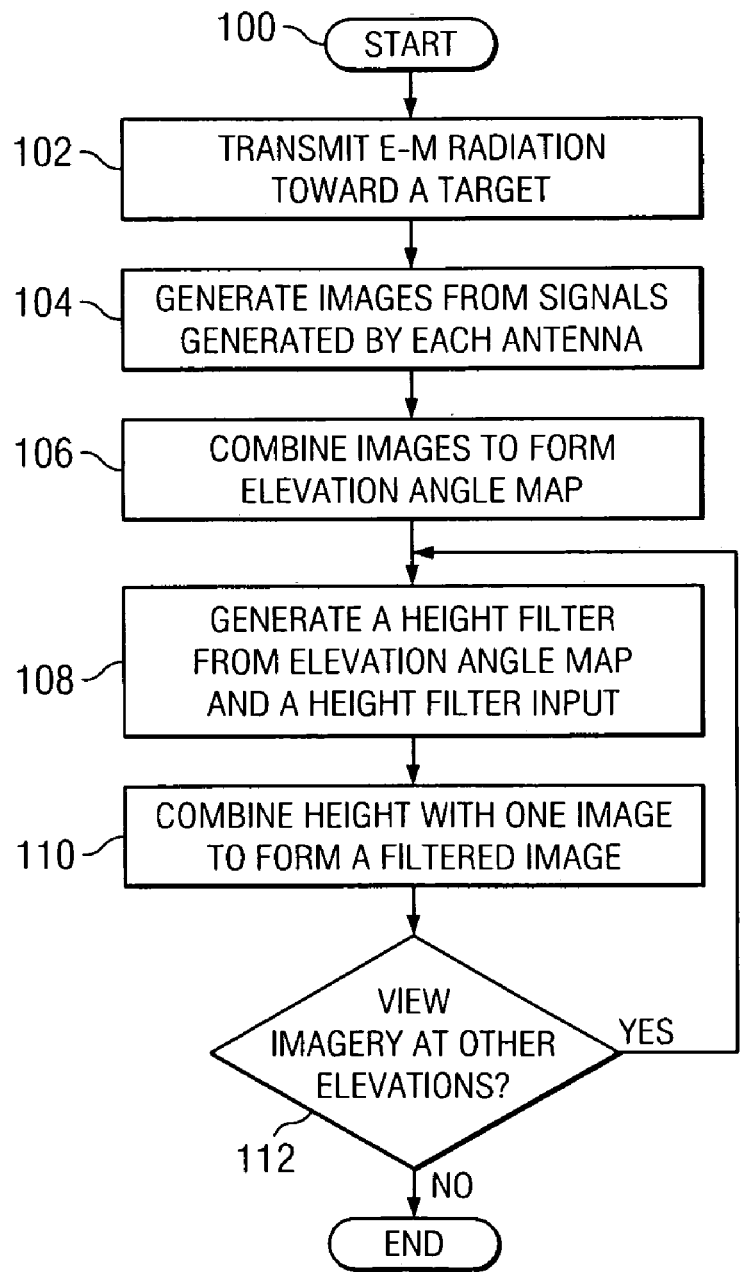
FIG. 3 is a flowchart showing one embodiment of a series of actions that may be performed for generation of imagery using the synthetic aperture radar of FIG. 1.

FIG. 3 is a flowchart showing one embodiment of a series of actions that may be performed for generation of imagery using synthetic aperture radar 10. In act 100, the process is initiated.

In act 102, one antenna 14a transmits electro-magnetic radiation toward a target, such as building 16. In other embodiments, the transmitted electro-magnetic radiation may be provided by one or more other antennas not directly coupled to synthetic aperture radar 10.

In act 104, image formation blocks 44a and 44b of image former 12 each generates an image from signals generated by antennas 14.

In act 106, image former 12, using combining block 48, combines the generated images to form elevation angle map 54. Reflected electro-magnetic radiation has an amplitude component that is proportional to an angular deviation of the various internal features relative to the orientation of its respective antenna. Because antennas 14 are configured at differing elevational angles relative to one another, the relative amplitude component of signals from each antenna 14 may be proportional to the physical elevation of the internal feature inside building 16. Elevation angle map 54 stores a comparison of the relative amplitude values for corresponding pixels of images generated by antennas 14.

In act 108, image former 12 generates a height filter 56 by combining elevation angle map 54 with a height focus input 58. In one embodiment, height focus input 58 is a value that may be linearly applied to each pixel of elevation angle map 54. That is, pixels having amplitude component values closer to the height focus input value may be attenuated less than other pixels that are not as close.

In act 110, image former 12 combines height filter 56 with an image generated from the signal generated by one antenna 14 to form a final image that is filtered according to the height of the various internal features.

In act 112, internal features at other elevations may be viewed by repeating acts 108 and 110 with the height focus input 58 at differing values. If, however, no further view of the internal features of building 16 is needed or desired, the process ends in act 114.

Figure 4A:
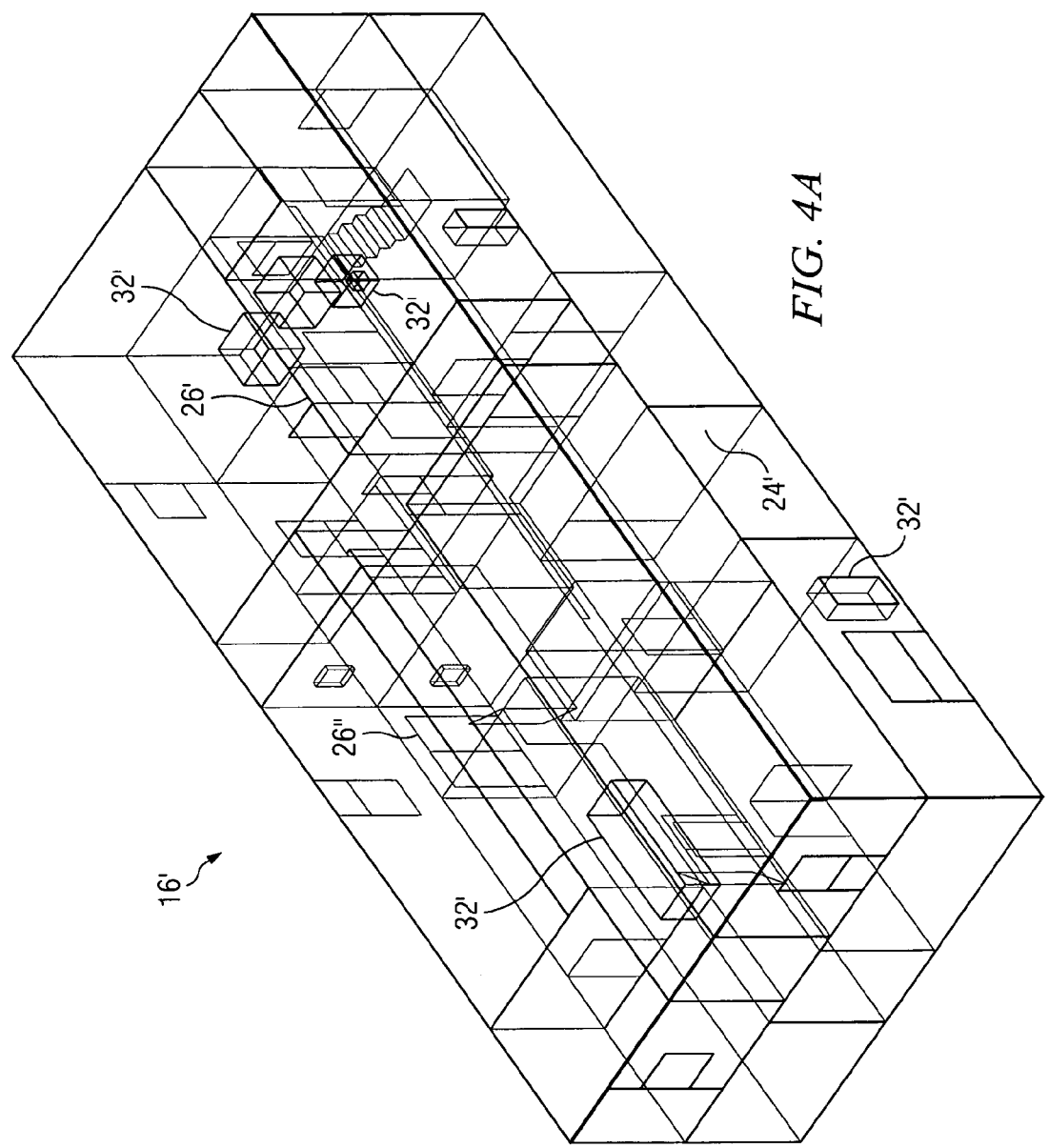
FIG. 4A is an isometric outline of an example building that may be imaged by the synthetic aperture radar of FIG. 1.

FIG. 4A is an isometric outline of an example building 16' that may be imaged by the synthetic aperture radar 10 of FIG. 1. As shown, building 16' has an first floor 20' and a second floor 22'. First floor 20' has several internal walls 24, several metal boxes 32', an open metal door 26', and a closed metal door 26". Second floor 22 has several internal walls 24 and a metal box 32'.

Figure 4B:
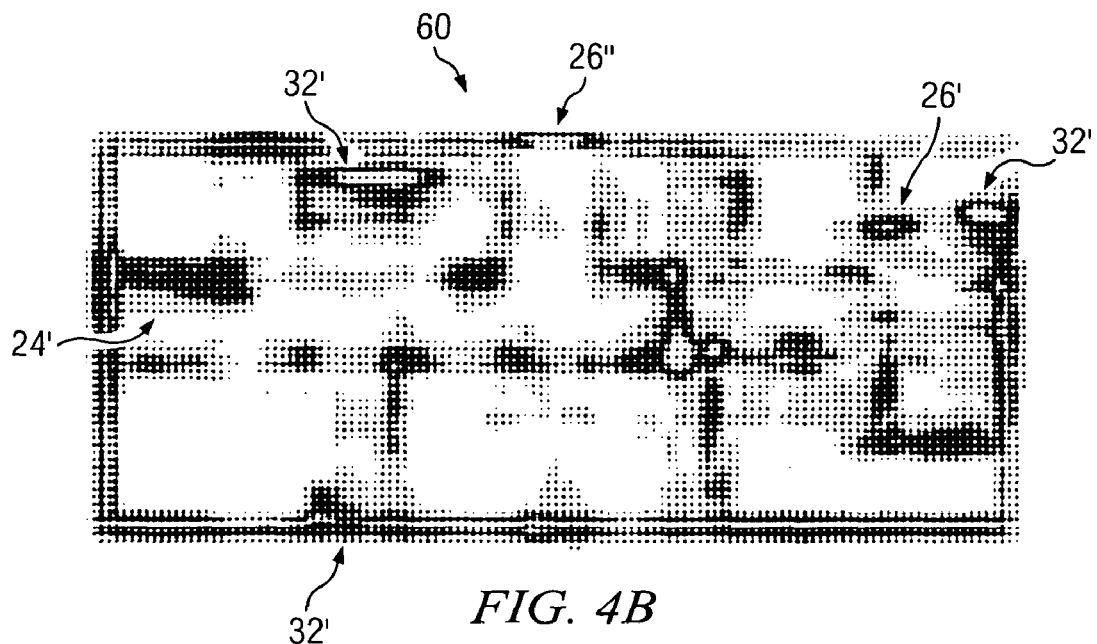
FIGS. 4B and 4C are a first floor image and a second floor image, respectively, that has been generated by the synthetic aperture radar of FIG. 1.
Figure 4C:
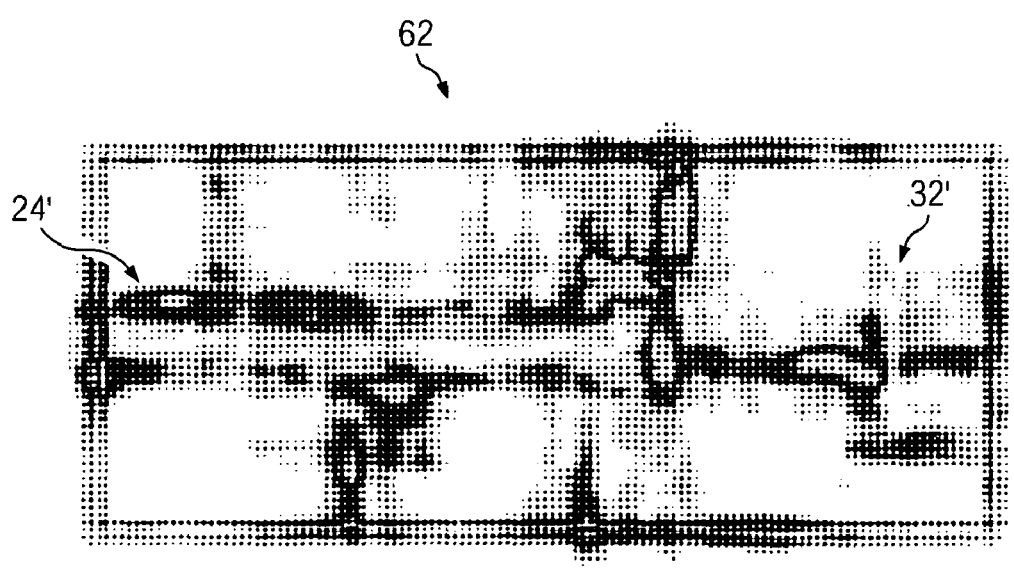

FIGS. 4B and 4C are a first floor image 60 and a second floor image 62, respectively, that has been generated by the synthetic aperture radar 10 of FIG. 1. First floor image 60 shows the internal walls 24', metal boxes 32', closed metal door 26", open metal door 26' existing in the first floor 20' of building 16'. Second floor image 62 shows the metal walls 24', and metal box 32' existing in the second floor 22' of building 16. As shown, the various internal features in each floor are unambiguously shown in the first floor image 60 and second floor image 62 according to their height.

Modifications, additions, or omissions may be made to synthetic aperture radar 10 without departing from the scope of the disclosure. The components of synthetic aperture radar 10 may be integrated or separated. For example, one of the antennas 14 that receives electro-magnetic radiation may also be configured to transmit electro-magnetic radiation or antennas 14 may be configured to receive electro-magnetic radiation from an independently operated antenna. Moreover, the operations of synthetic aperture radar 10 may be performed by more, fewer, or other components. For example, synthetic aperture radar 10 may include additional equipment such as visual photographic devices, or global positioning system (GPS) devices that correlates imagery generated by synthetic aperture radar 10 according to its position relative to the target. Additionally, operations of controller circuit 14 may be performed using any suitable logic comprising software, hardware, and/or other logic.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A synthetic aperture radar comprising:
an image former comprising instructions stored in a memory and executable on a computing system, the image former coupled to a first antenna and a second antenna that are adjacent to and oriented at differing elevational angles relative to one another, the first antenna and the second antenna configured in a land-based vehicle that is operable to move horizontally relative to a building having one or more internal features, the first antenna operable to transmit electro-magnetic radiation toward the building with a frequency in the range of 0.5 to 3.0 Giga-Hertz, the image former operable to:
receive a first signal having a first amplitude component from the first antenna and a second signal having a second amplitude component from the second antenna, the first signal and the second signal indicative of electro-magnetic radiation reflected from the building;
generate a first image according to the received first signal and a second image according to the received second signal; and
generate the third image by generating a height discriminant map comprising pixels corresponding to the first amplitude portions of the first image and the second amplitude pixels of the second image, and filtering the first image using the height discriminant map to form the third image.

2. A synthetic aperture radar comprising:
an image former comprising instructions stored in a memory and executable on a computing system, the image former coupled to a first antenna and a second antenna that are oriented at differing elevational angles relative to one another, the first antenna and the second antenna configured in a land-based vehicle that is operable to move horizontally relative to a target having one or more internal features, the image former operable to:
receive a first signal having a first amplitude component from the first antenna and a second signal having a second amplitude component from the second antenna, the first signal and the second signal indicative of electro-magnetic radiation reflected from the target;
generate a first image according to the received first signal and a second image according to the received second signal; and
generate a third image by filtering the second amplitude component of portions of the second image against the first amplitude component of corresponding portions of the first image, the first amplitude component and the second amplitude component indicative of an elevational deviation of the one or more internal features relative to the elevational angle of its respective antenna.

3. The synthetic aperture radar of claim 2, wherein the first antenna is operable to transmit the electro-magnetic radiation toward the target.

4. The synthetic aperture radar of claim 2, wherein the image former is operable to generate the third image by generating a height discriminant map comprising portions corresponding to the first amplitude portions of the first image and the second amplitude portions of the second image, and filtering the first image using the height discriminant map to form the third image.

5. The synthetic aperture radar of claim 2, wherein the land-based vehicle comprises a radome that is configured over a portion of a surface of the land-based vehicle, the radome operable to conceal the first antenna and the second antenna.

6. The synthetic aperture radar of claim 2, wherein the target comprises a building.

7. The synthetic aperture radar of claim 2, wherein the electro-magnetic radiation has a frequency in the range of 0.5 to 3.0 Giga-Hertz.

8. The synthetic aperture radar of claim 2, wherein the first antenna is configured adjacent to the second antenna.

9. The synthetic aperture radar of claim 2, wherein the portions of the first image and the second image comprise pixels of the first image and the second image.

10. The synthetic aperture radar of claim 2, wherein the land-based vehicle comprises a truck.

11. The synthetic aperture radar of claim 2, wherein the one or more internal features are selected from the group consisting of a doorway, a wall, a window, a metal box, a door, and a person.

12. An imaging method comprising:
receiving a first signal having a first amplitude component from a first antenna and a second signal having a second amplitude component from a second antenna that is oriented at a differing elevational angle relative to the first antenna, the first antenna and the second antenna configured in a land-based vehicle that moves horizontally relative to a target having one or more internal features, the first signal and the second signal indicative of electro-magnetic radiation reflected from the target;
generating a first image according to the received first signal and a second image according to the received second signal; and
generating a third image by filtering the second amplitude component of portions of the second image against the first amplitude component of corresponding portions of the first image, the first amplitude component and the second amplitude component indicative of an elevational deviation of the one or more internal features relative to the elevational angle of its respective antenna.

13. The imaging method of claim 12, further comprising transmitting, by the first antenna, the electro-magnetic radiation toward the target.

14. The imaging method of claim 12, wherein generating the third image comprises generating the third image by generating a height discriminant map comprising portions corresponding to the first amplitude portions of the first image and the second amplitude portions of the second image, and filtering the first image using the height discriminant map to form the third image.

15. The imaging method of claim 12, further comprising concealing, using a radome configured over a portion of a surface of the land-based vehicle, the first antenna and the second antenna inside the land-based vehicle.

16. The imaging method of claim 12, further comprising moving the first antenna and the second antenna horizontally with respect to a building.

17. The imaging method of claim 12, wherein receiving the first signal and the second signal comprises receiving the first signal and the second signal having a frequency in the range of 0.5 to 3.0 Giga-Hertz.

18. The imaging method of claim 12, further comprising receiving the first signal from the first antenna and the second signal from the second antenna that is adjacent to the first antenna.

19. The imaging method of claim 12, wherein the first antenna and the second antenna are configured in a truck that moves horizontally relative to the target.

20. The imaging method of claim 12, wherein generating the third image by filtering the second amplitude component of portions of the second image against the first amplitude component of corresponding portions of the first image comprises generating the third image by filtering the second amplitude component of pixels of the second image against the first amplitude component of corresponding pixels of the first image.

* * * * *